US010621080B2

(12) United States Patent
Jain et al.

(10) Patent No.: US 10,621,080 B2
(45) Date of Patent: Apr. 14, 2020

(54) PIPELINED HASH TABLE WITH REDUCED COLLISIONS

(71) Applicant: Intel Corporation, Santa Clara, CA (US)

(72) Inventors: Sanjeev Jain, Chandler, AZ (US); Karl S. Papadantonakis, Agoura Hills, CA (US); Robert G. Southworth, Chatsworth, CA (US); Alain Gravel, Thousand Oaks, CA (US); Jonathan A. Dama, Encino, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 15/088,726

(22) Filed: Apr. 1, 2016

(65) Prior Publication Data

US 2017/0286006 A1    Oct. 5, 2017

(51) Int. Cl.
*G06F 12/02*    (2006.01)
*G06F 9/54*    (2006.01)

(52) U.S. Cl.
CPC .............. *G06F 12/023* (2013.01); *G06F 9/54* (2013.01); *G06F 12/0292* (2013.01); *G06F 2212/1024* (2013.01); *G06F 2212/1044* (2013.01); *Y02D 10/13* (2018.01)

(58) Field of Classification Search
CPC ........... G06F 12/023; G06F 2212/1024; G06F 2212/1044; G06F 12/0292; G06F 9/54; Y02D 10/13
See application file for complete search history.

(56) References Cited

U.S. PATENT DOCUMENTS

| 5,287,499 A | * | 2/1994 | Nemes ................ G06F 12/0292 |
| 5,414,704 A | * | 5/1995 | Spinney ................. H04L 12/46 |
| | | | 370/389 |
| 5,920,900 A | * | 7/1999 | Poole ................ G06F 17/30949 |
| | | | 707/E17.036 |

(Continued)

FOREIGN PATENT DOCUMENTS

WO    WO-2017172183 A1    10/2017

OTHER PUBLICATIONS

"International Application Serial No. PCT/US2017/019931, International Search Report dated May 30, 2017", 3 pgs.

(Continued)

*Primary Examiner* — Miranda Le
(74) *Attorney, Agent, or Firm* — Schwegman Lundberg & Woessner, P.A.

(57) ABSTRACT

Apparatuses and methods for pipelined hashing are described herein. An example apparatus to perform a pipelined hash function may include a first memory to store a first plurality of bucket records, a second memory to store a second plurality of bucket records, and a hash circuit to receive a key and to perform a pipelined hash function using the key to provide a hash value. The hash circuit further to select a first bucket record of the first plurality of bucket records from the first memory based on a first subset of bits of the hash value. The hash circuit further to provide a location of a particular entry of an entry record of the plurality of entry records based on contents of the first bucket record and a second subset of bits of the hash value.

8 Claims, 7 Drawing Sheets

(56) References Cited

U.S. PATENT DOCUMENTS

| | | | | |
|---|---|---|---|---|
| 6,061,712 | A * | 5/2000 | Tzeng | H04L 45/00 370/392 |
| 6,665,297 | B1 | 12/2003 | Hariguchi et al. | |
| 7,257,672 | B2 * | 8/2007 | Shoham | G06F 11/1064 365/49.1 |
| 7,290,084 | B2 * | 10/2007 | Miller | G11C 15/00 711/108 |
| 7,613,775 | B2 * | 11/2009 | Greaves | H04L 49/351 706/48 |
| 7,653,670 | B2 * | 1/2010 | Hasan | G06F 16/9014 707/999.205 |
| 7,856,523 | B2 * | 12/2010 | Bittner, Jr. | G11C 15/00 711/108 |
| 8,204,871 | B1 * | 6/2012 | Pawar | G06F 17/30132 707/639 |
| 8,266,116 | B2 * | 9/2012 | Agarwal | G06F 16/9014 707/693 |
| 8,484,439 | B1 | 7/2013 | Frailong et al. | |
| 8,577,854 | B1 * | 11/2013 | Kopelman | G06F 17/30864 707/696 |
| 8,854,972 | B1 | 10/2014 | Li | |
| 8,924,687 | B1 * | 12/2014 | Frailong | G06F 12/06 711/216 |
| 9,135,833 | B2 * | 9/2015 | Guleria | G09C 1/00 |
| 9,280,609 | B2 * | 3/2016 | Liu | G06F 12/1018 |
| 9,361,238 | B2 * | 6/2016 | Sun | G06F 12/1018 |
| 9,471,500 | B2 * | 10/2016 | Kruus | G06F 12/0871 |
| 9,645,824 | B2 * | 5/2017 | Vasekin | G06F 9/3806 |
| 2006/0064508 | A1 * | 3/2006 | Panwar | H04L 49/90 709/250 |
| 2008/0295172 | A1 * | 11/2008 | Bohacek | H04L 63/1416 726/23 |
| 2009/0299966 | A1 * | 12/2009 | Schneider | G06F 17/30327 |
| 2010/0080231 | A1 * | 4/2010 | Lala | H04L 49/90 370/394 |
| 2012/0136889 | A1 | 5/2012 | Jagannathan et al. | |
| 2014/0064276 | A1 * | 3/2014 | Basso | H04L 45/7453 370/392 |
| 2014/0153571 | A1 | 6/2014 | Neugebauer et al. | |
| 2014/0334489 | A1 * | 11/2014 | Bosshart | H04L 47/56 370/392 |
| 2016/0020992 | A1 * | 1/2016 | Wu | H04L 49/3009 709/212 |

OTHER PUBLICATIONS

"International Application Serial No. PCT/US2017/019931, Written Opinion dated May 30, 2017", 10 pgs.

\* cited by examiner

PIPELINED HASH TABLE WITH REDUCED COLLISIONS

BACKGROUND

Modern switching hardware supports complex packets that stack multiple protocols such as multiprotocol label switching (MPLS), stacked virtual local area network (VLAN), and internet protocol (IP)-in-IP. In order to process a packet, hardware may classify each packet by comparing a key taken from the packet to a table of flow entries. Virtualization, tunneling. OpenFlow, and network address translation (NAT) applications may require a flow table of more than 100K entries, each of which can be 64 or more bytes. Some protocols requires that the classification process for a packet happen within a single clock cycle, with low latency and low power consumption.

Some memory architectures, such as content-addressable memory (CAM) may include a deterministic table structure for low latency classification, but may also consume much more power (e.g., ten times) and take up much more area (e.g., four times or more) than a random-access memory (RAM) of the same size. In some examples, hash tables may be used in a RAM architecture because of the limitations of a CAM architecture, but RAM architectures have limitations, such as an inability to fill a RAM architecture to capacity (e.g., only up to 60% capacity) due to collision and latency issues.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some network packet processing solutions have focused on using various hash functions, such as d-left, cuckoo hash, binary search tree (BST) functions, and dynamic perfect hashing. However, these functions all have some combination of latency and collision issues that require a substantial CAM architecture device to supplement a RAM architecture device, which may dramatically increase the memory overhead, e.g., by 40% or more.

Described embodiments provide a way to use an entire capacity of a RAM architecture device while avoiding the latency pitfalls of the previous solutions. An ability to use the entire capacity of the RAM architecture device may reduce the memory overhead to 1% or less. Further, because the memory overhead may be approximately 1% or less, power consumption required to access a much smaller overhead memory device in response to a miss may also be reduced.

Embodiments provide control plane methods, systems, and devices to perform pipelined hash table processing to determine a process flow for packet processing. The pipelined hash table processing can be performed on data plane components, which can include, by way of non-limiting example, Data Plane Development Kit (DPDK) components, field programmable gate array (FPGA) components, and switch components available from Intel® of Santa Clara, Calif., among other components. Methods in accordance with various embodiments can coordinate utilization of these and other components in a dynamic and flexible fashion based on user-defined and user-configured actions to reduce or minimize energy consumption or to enhance speed and performance. In embodiments, a control plane can offload a simple fast packet-processing pipeline from software-based switches or virtual switches to switch hardware, while providing for more-complicated processing on the CPU-based software data plane.

Figure 1:
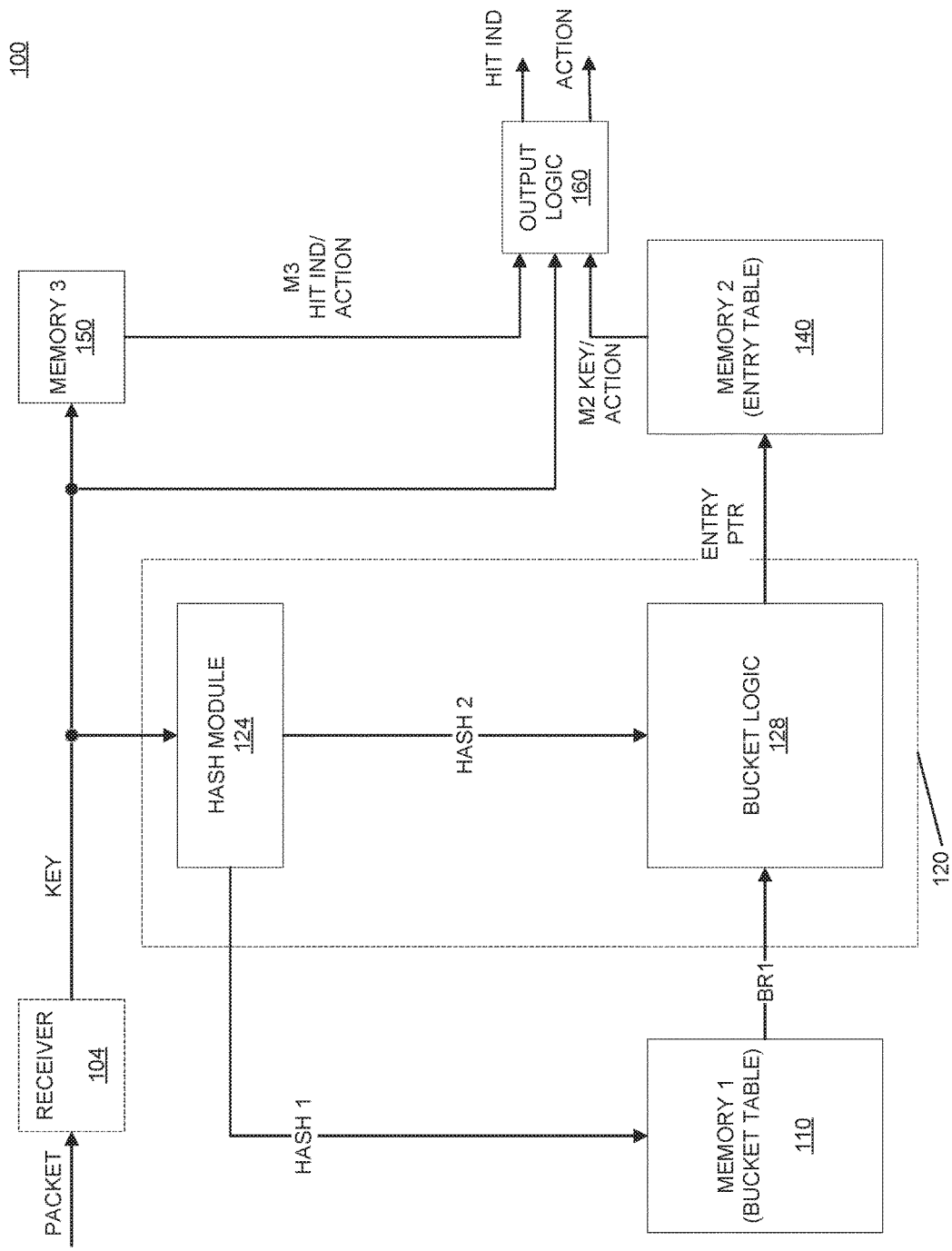
FIG. 1 illustrates components of an apparatus including a pipelined hash circuit in accordance with some embodiments.

FIG. 1 illustrates components of an apparatus 100 for performing pipelined hash function methods in accordance with some embodiments. Illustration of the embodiments present just those components necessary for appreciating the depicted embodiments, such that other components are foreseeable without departing from the teachings herein.

The apparatus 100 may include a receiver 104 to receive a packet and to provide a process flow key KEY to a hash circuit 120 and a memory 3 150. The hash circuit 120 may perform a pipelined hash function using the KEY to provide a hash value, and may provide an entry pointer ENTRY PTR to indicate a location of (e.g., an index value, a pointer value, a physical address value, logical address value or some of means of identifying a particular location of the memory 2 140) an entry of an entry record of a plurality of entry records stored at a memory 2 140 based on the hash value and a plurality of bucket records stored at a memory 1 110. A output logic circuit 160 may process the entry (e.g., the M2 KEY/ACTION) from the memory 2 140 and an output (e.g., the HIT IND/ACTION) from an entry of an entry record of a plurality of entry records stored at the memory 3 150 to provide an output hit indication HIT IND and an output action ACTION at an output.

The receiver 104 may include circuitry to receive a packet and to generate the KEY based on contents of the packet. The KEY may be used by the apparatus 100 to determine a process flow for the packet. That is, each key may be associated with an action used to process a packet. The KEY may be based on a source IP address, a destination IP address, applications or protocols associated with the packet, and other data included in the packet. For complex packet architectures, a number of process flows can be 100K or more. Accordingly, the KEY may be large enough (e.g., 424 bits or more) to accommodate the large number of process flows.

The hash circuit 120 may process the KEY to provide the ENTRY PTR to indicate a location of (e.g., an index value, a pointer value, a physical address value, logical address value or some of means of identifying a particular location of the memory 2 140) an entry in a bucket of the memory 2 140. The hash circuit 120 may include a hash module 124 to perform a hash function on the KEY to provide a hash value that may include two portions, e.g., a HASH1 value (e.g., a first subset of bits) and a HASH2 value (e.g., a second subset of bits). The HASH1 value may to indicate a location of (e.g., an index value, a pointer value, a physical address value, logical address value or some of means of identifying a particular location of the memory 1 110) to a bucket record BR1 stored at the memory 1 110. The hash circuit 120 may further include bucket logic circuitry 128 that processes the HASH2 value and data stored in the BR1 to provide the ENTRY PTR. In some examples, the hash value is 30 bits, with the HASH1 value having 14 bits and the HASH2 value having 16 bits, although embodiments are not limited thereto.

The memory 2 140 may provide a key and an action pair M2 KEY/ACTION stored in an entry of an entry record pointed to by the ENTRY PTR to the output logic circuit 160. The memory 3 150 may receive the KEY from the receiver 104 and may provide a hit indication (e.g., an indication as to whether the memory 3 150 includes an entry record with a key that matches the KEY received from the receiver 104) and action pair M3 HIT IND/ACTION. If no entry record is located, the M3 HIT IND may indicate a miss and no action may be provided by the memory 3 150. In some examples, the memory 1 110 and/or the memory 2 140 may include RAM architectures, and the memory 3 150 may include a CAM architecture.

The output logic circuit 160 may include circuitry to receive the M3 HIT IND/ACTION provided by the memory 3 150 and the M2 KEY/ACTION provided by the memory 2 140, and may provide the HIT IND and the ACTION. The ACTION may define the process flow for the packet. The packet may be processed by other circuitry (not shown) of the apparatus 100 based on the ACTION.

In operation, the receiver 104 may receive a packet. The packet may be a complex packet that stacks multiple protocols, such as MPLS, stacked VLAN, IP-in-IP, etc. It will be appreciated that use cases other than processing a packet may be realized, and the apparatus 100 may be used in contents other than packet processing. The receiver 104 may generate the KEY based on contents of the packet, which may be used to determine a process flow for the packet. Due to complexity and variety in packet construction, the number of potential process flows to be evaluated for a given packet can be 100K or more. The memory 2 140 and the memory 3 150 may store process flow entries in entry records for each contemplated process flow, and when a non existing process flow is detected (e.g., a miss), the entry records of the memory 2 140 and/or memory 3 150 may be updated to reflect the new process flow. Rather than performing a time-consuming, sequential comparison of keys stored at each entry record of the memory 2 140 with the KEY, the hash circuit 120 and the memory 1 110 may perform a pipelined hash function using the KEY to indicate a location of (e.g., an index value, a pointer value, a physical address value, logical address value or some of means of identifying a particular location of the memory 2 140) a likely matching entry in an entry record of the memory 2 140.

The idea behind hashing may be to distribute entries (e.g., Key/Action pairs) across an array of entry records stored at a memory, such as the memory 2 140. Ideally, given a key, a hash function generates a hash value that is used to provide a pointer to indicate a location of an entry record that includes the target key/action pair. However, hashing often results in collisions where the distribution of entries is not perfect because it is impractical or impossible to contemplate every possible combination of bits in the key values. Therefore, a hash function may generate the same hash value for two different keys, resulting in collisions. In these instances, an entry record stored at a memory may include two or more different entries. Further, it is often not known which entry record(s) will need to include more than one entry, or how many entries each particular entry record will need. One way to accommodate the possibility of more than one entry per entry record is to allocate memory space for a predetermined number of entries for each entry record, where the predetermined number is selected based on a likely maximum number of entries necessary for a given entry record. However, because many of the entry records will use less or far less than the predetermined number, a large amount of memory may go unused.

The combination of the memory 1 110 and the hash circuit 120 may provide or allow a method for unique identification and a pointer to a particular entry of a bucket record stored at the memory 2 140 based on the key in a single clock cycle (e.g., hence the hash function is pipelined to operate once a clock cycle). Further, for each received key value, the memory 1 110 and the memory 2 140 are each only accessed (e.g., read) one time (e.g., a single lookup per received key value). The combination of the memory 1 110 and the hash circuit 120 may also allow efficient use of the memory 2 140 such that each entry record is only allocated memory for entries actually stored, rather than allocation based on a number of possible entries. That is, if an entry record stored at the memory 2 140 has only stored three entries of the possible 32 entries, the three entries may be stored sequentially and the next entry record may begin immediately after the last of the three entries.

The hash module 124 may perform a hash function on the KEY to provide the HASH1 and HASH2 values. The HASH1 value may be provided to the memory 1 110 to retrieve the BR1 from the memory 1 110. The BR1 may include three fields that may be used, along with the HASH2 value, to provide the ENTRY PTR to the memory 2 140. The first field may include a bucket pointer. The bucket pointer may identify a starting address location of a first entry of an entry record of the memory 2 140 that holds the entry corresponding to the KEY.

The second field may include a mask field. The mask field may identify which of the possible entries for the entry record of the memory 2 140 are currently stored in the memory 2 140. For example, it may be possible store up to 32 entries for an entry record of the memory 2 140, but only a subset of those entries are actually used (e.g., by way of example, the $2^{nd}$, $4^{th}$, and $30^{th}$ entries may actually be used). The mask field may be a set of bits equal to a number of possible allocated entries (e.g., 32 bits, in the example), with only the bits set for the entries that are actually stored (e.g., bits 2, 4, and 30, in the example) in the entry record at the memory 2 140.

The third field may include a select field. The select field may include a set of values (e.g., select values) that identify a subset of individual bits of the HASH2 value that can be used to uniquely identify which entry of the entry record stored at the memory 2 140 is associated with the key. The order of the entries and the particular select values may be determined algorithmically to pick a subset of the HASH2 bits that yield a different aggregated value for each entry of an entry record.

To determine the ENTRY PTR, the bucket logic circuitry 128 may first apply the select values to the HASH2 value to provide an ENT_SEL value. The ENT_SEL value may identify a particular entry of the entry record stored at the memory 2 140 that is associated with the key. The number of bits in the ENT_SEL value may be based on a count of possible entries for a given entry record. For example, if an entry record may include up to 32 entries, the ENT_SEL value may include at least five bits selected from the HASH2 value based on the select values from the BR1 The hash circuit 120 may then determine how many of the possible previous entries (e.g., sequentially before the particular entry identified using ENT_SEL value) of the entry record are actually stored with the entry record at the memory 2 140. In the example, if the particular entry identified by the ENT_SEL is the $30^{th}$ entry, and the only other entries actually stored in the entry record are the second and the fourth entries, then there are only two previous entries. Finally, the hash circuit 120 may add the count of the previous entries stored multiplied by an entry size of each entry to the bucket pointer to provide the ENTRY PTR.

At an output, the memory 2 140 may provide the M2 KEY/ACTION to the output logic circuit 160 selected based on the ENTRY PTR. Sometimes the use of hash functions can result is situations where it is impossible to differentiate between collisions (e.g., to distinguish between two keys based on the hash values). In other examples, an entry record may fill up beyond the allocated number of entries (e.g., more than 32 entries, in the example discussed above). For these special cases, the memory 3 150 may store a key and action pairs as entry records to supplement the entry records stored at the memory 2 140. In parallel with provision of the M2 KEY/ACTION from the memory 2 140, the memory 3 150 may compare the KEY to entries stored at the memory 3 150, and may provide the M3 HIT IND/ACTION to the output logic circuit 160 based on the comparison. For example, if there is a hit, the M3 HIT IND will indicate the hit, and the corresponding ACTION may be provided. If the comparison results in a miss (e.g., no key stored at the memory 3 150 matches the KEY), the M3 HIT IND indicates a miss and no ACTION may be provided.

The output logic circuit 160 may provide the HIT IND and the ACTION based on the outputs received from the memory 2 140 and the memory 3 150. In an example, a hit from the M3 takes priority over a key match from the memory 2 140. For example, if M3 HIT IND from the memory 3 150 indicates a hit, the output logic circuit 160 may provide the M3 ACTION as the ACTION at an output, regardless of the M2 KEY/ACTION from the memory 2 140. If the M3 HIT IND indicates a miss, then the output logic circuit 160 may compare the M2 KEY to the KEY, and if a hit (e.g., a match) is detected, the output logic circuit 160 may provide indicate a hit via the HIT IND and may provide the M2 ACTION as the ACTION. If no hit is detected, the HIT IND may indicate a miss, and no action provided at the as the ACTION. The apparatus 100 may process the packet based on the ACTION provided from the output logic circuit 160.

By allocating only a required amount of memory for each entry record in the memory 2 140, 100% of the memory 2 140 may be available for use, as compared with conventional solutions that set aside possible use for each entry record and therefore only have use of 60% or less of available memory. Because 100% of the memory 2 140 is available for use, more entries may be stored at the memory 2 140, which may result in a reduction in the size of the memory 3 150 as compared with a design where only 60% of a RAM device is available for use. Further, use of the memory 1 110 and the hash circuit 120 may provide an efficient means uniquely identifying and providing an indication of a location of an entry of a entry record of the memory 2 140 within a single clock cycle using a single hash function and a small amount of overhead memory in the memory 1 110. Combined, the memory 1 110 and the memory 3 150 may be less than 1% of the total memory of the memory 2 140. In an embodiment, the memory 2 140 may be 8 megabytes (MB), the memory 3 150 may be 2 kilobytes (KB) and the memory 1 110 may be 144 KB.

Figure 2:
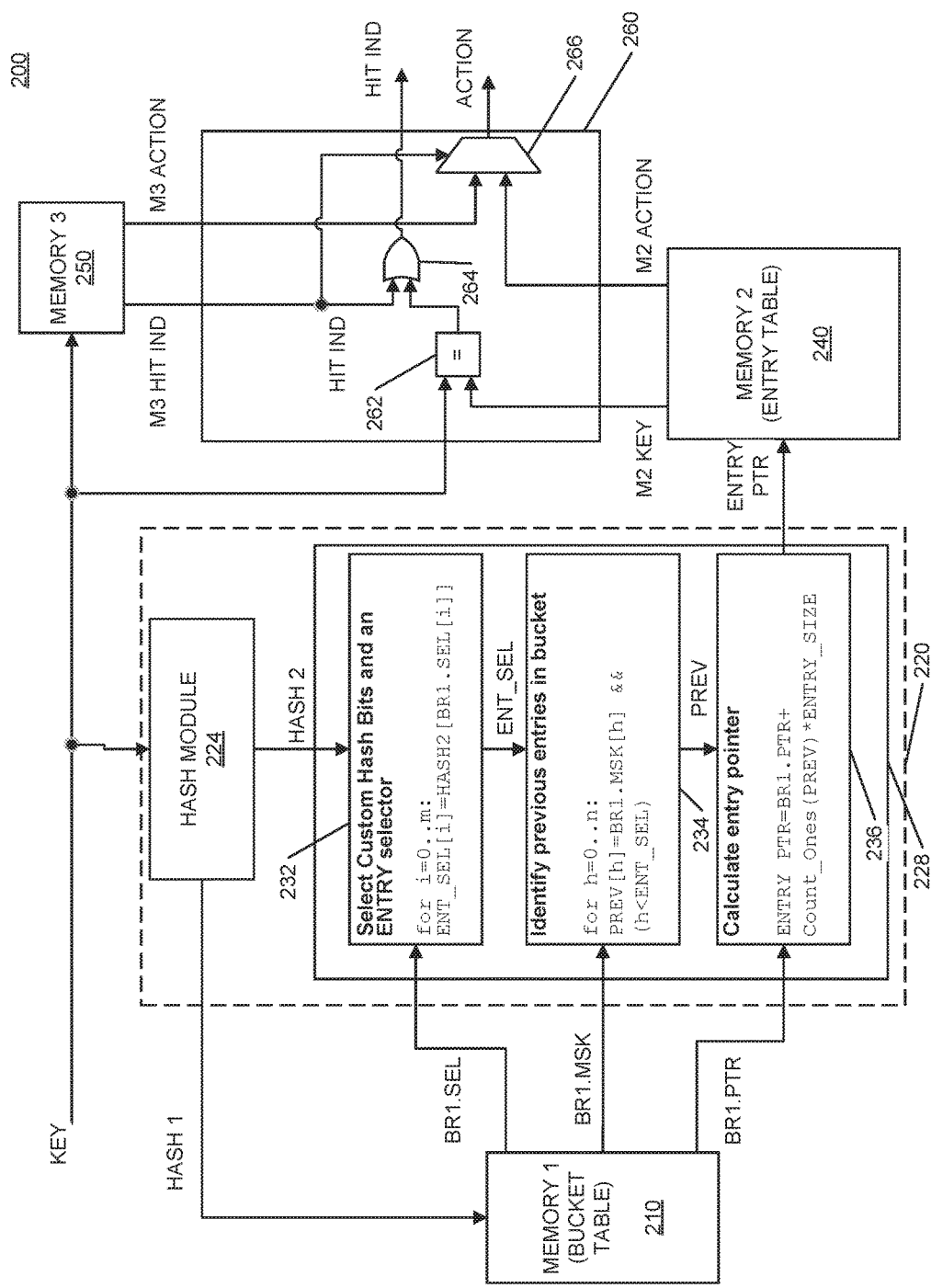
FIG. 2 illustrates components of an apparatus including a pipelined hash circuit in accordance with some embodiments.

FIG. 2 illustrates components of an apparatus 200 for performing pipelined hash function methods, including a specific implementation of bucket logic circuitry 228 in accordance with some embodiments. Illustration of the embodiments present just those components necessary for appreciating the depicted embodiments, such that other components are foreseeable without departing from the teachings herein.

The apparatus 200 may receive a process flow key KEY at a hash circuit 220 and a memory 3 250. The hash circuit 220 may perform a pipelined hash function using the KEY to provide a hash value, and may provide an entry pointer to indicate a location of (e.g., an index value, a pointer value, a physical address value, logical address value or some of means of identifying a particular location of the memory 2 140) an entry of an entry record in a memory 2 240 based on the hash value and bucket records stored at a memory 1 210. An output logic circuit 260 may process the entry from the memory 2 240 and an output of the memory 3 250 to provide an output hit indication HIT IND and an output action ACTION at an output. The hash circuit 120 of FIG. 1 may include the hash circuit 220, the memory 1 110 of FIG. 1 may include the memory 1 210, the memory 2 140 of FIG. 1 may include the memory 2 240, the memory 3 150 of FIG. 1 may include the memory 3 250, the output logic circuit 160 of FIG. 1 may include the output logic circuit 260, or combinations thereof.

The hash circuit 220 may process the KEY to provide the ENTRY PTR to indicate a location (e.g., an index value, a pointer value, a physical address value, logical address value or some of means of identifying a particular location of the memory 2 140) of an entry in a bucket of the memory 2 240. The hash circuit 220 may include a hash module 224 to perform a hash function on the KEY to provide a hash value that may include two portions, e.g., a HASH1 value and a HASH2 value. The HASH1 value may indicate a location (e.g., an index value, a pointer value, a physical address value, logical address value or some of means of identifying a particular location of the memory 2 140) of a bucket record BR1 stored at the memory 1 210. The BR1 may include three fields: a select field BR1.SEL that includes a set of values (e.g., select values) identifying a subset of individual bits of the HASH2 value that can be used to uniquely identify which entry of the entry record stored at the memory 2 240 is associated with the key; a mask field BR1.MSK to identify which of the possible entries for the entry record of the memory 2 240 are currently stored in the memory 2 240; and a bucket pointer BR1.PRT field to indicate a location (e.g., an index value, a pointer value, a physical address value, logical address value or some of means of identifying a particular location of the memory 2 140) of a starting address of the entry record at the memory 2 240.

The hash circuit 220 may further include bucket logic circuitry 228 that processes the HASH2 value and data stored in the BR1 to provide the ENTRY PTR. In some examples, the hash value is 30 bits, with the HASH1 value having 14 bits and the HASH2 value having 16 bits. The bucket logic circuitry 228 may include an entry selection module 232 to provide an entry select value ENT_SEL that identifies a particular entry of a corresponding entry record based on the BR1.SEL field values. The ENT_SEL value may be based on individual bits selected from the HASH2 value based on the BR1.SEL. For example, the BR1.SEL may include m+1 select values. The entry selection module 232 may iteratively select a bit of the HASH2 value that corresponding to each of the m+1 select values to provide the ENT_SEL value.

The bucket logic circuitry 228 may further include a previous entry identifier 234 configured to determine which or the possible entries of the entry record sequentially before the ENT_SEL entry are actually stored at the memory 2 240 using the BR1.MSK. The BR1.MSK values may include a bit for each possible entry, with the bits for entries that are actually stored at the memory 2 240 being set. The previous entry identifier 234 may cycle through each bit of the BR1.MSK and set a corresponding bit of a previous array PREV to a 1 when the BR1.MSK bit is set and the count (h) is less than the ENT_SEL.

The bucket logic circuitry 228 may further include a previous entry identifier 234 configured to provide the entry pointer based on the BR1.PTR and the PREV array. The BR1.PTS may include a starting address of a target bucket record stored at the memory 2 240. The previous entry identifier 234 may add a count of set bits multiplied by an entry size to the BR1.PTR address to provide the ENTRY PTR having a value that provides the indication of the location of a target entry of the entry record.

The memory 2 240 may provide, to the output logic circuit 260, a key M2 KEY and an action M2 ACTION pair stored in the target entry of the entry record pointed to by the ENTRY PTR. The memory 3 250 may receive the KEY and may provide a hit indication M3 HIT IND (e.g., an indication as to whether the memory 3 250 includes an entry record with a key that matches the KEY received from the 204) and action M3 ACTION pair. If no entry record is located, the M3 HIT IND may indicate a miss and no action may be provided by the memory 3 250. In some examples, the memory 1 210 and/or the memory 2 240 may include RAM architectures, and the memory 3 250 may include a CAM architecture.

The output logic circuit 260 may include circuitry to receive the M3 HIT IND and M3 ACTION provided by the memory 3 250 and the M2 KEY and M2 ACTION provided by the memory 2 240, and may provide the HIT IND and the ACTION. The ACTION may define the process flow for the packet. The output logic circuit 260 may include a comparator 262 configured to compare the KEY and the M2 KEY and provide a hit indication to an OR logic gate 264. The OR logic gate 264 may further receive the M3 HIT IND from the memory 3 250, and may provide the HIT IND having a value based on OR logic between the hit indication from the comparator 262 and the M3 HIT IND. The output logic circuit 260 may further include a multiplexer 266 to receive the M3 ACTION and the M2 ACTION. The multiplexer 266 may provide one of the M3 ACTION or the M2 ACTION as the ACTION based on the M3 HIT IND received from the memory 3 250. The packet may be processed by other circuitry (not shown) of the apparatus 200 based on the ACTION.

In operation, the apparatus 200 may provide the KEY, which may be generated based on contents of a received packet to the hash circuit 220 and the memory 3 250. It will be appreciated that use cases other than processing a packet may be realized, and the apparatus 100 may be used in contents other than packet processing. The KEY may be used to determine a process flow for the received packet. Due to complexity and variety in packet construction, the number of potential process flows to be evaluated for a given packet can be 100K or more. The memory 2 240 and the memory 3 250 may store process flow entries in entry record for known process flows, and when no existing process flow is detected (e.g., a miss), the entry record of the memory 2 240 and/or memory 3 250 may be updated to reflect the new process flow. Rather than performing a time-consuming, sequential comparison of keys stored at each entry record of the memory 2 240 with the KEY, the hash circuit 220 and the memory 1 210 may perform a pipelined hash function using the KEY to indicate a location (e.g., an index value, a pointer value, a physical address value, logical address value or some of means of identifying a particular location of the memory 2 140) of a likely matching entry in an entry record of the memory 2 240.

The combination of the memory 1 210 and the hash circuit 220 may provide or enable a method for unique identification and a pointer to a particular entry of an entry record stored at the memory 2 240 based on the key. The combination of the memory 1 210 and the hash circuit 220 may also allow efficient use of the memory 2 240 such that each bucket record is only allocated memory for entries actually stored, rather than allocation based on a number of possible entries. That is, if an entry record stored at the memory 2 240 has only stored three entries of the possible 32 entries, the three entries may be stored sequentially and the next entry record may begin immediately after the last of the three entries.

The hash module 224 may perform a hash function on the KEY to provide the HASH1 and HASH2 values. The HASH1 value may be provided to the memory 1 210 to retrieve the BR1 from the memory 1 210.

To determine the ENTRY PTR, the entry selection module 232 may iteratively apply the select values to the HASH2 value to provide an ENT_SEL value. The ENT_SEL value may identify a particular entry of the entry record stored at the memory 2 240 that is associated with the key. The number of bits m+1 in the ENT_SEL value may be based on a count of possible entries for a given entry record. For example, if an entry record may include up to 32 entries, m+1 may be equal to or greater than five.

The previous entry identifier 234 may then determine which of the possible sequentially previous entries (e.g., sequentially before the particular entry identified using ENT_SEL value) of the entry record are actually stored with the entry record at the memory 2 240 based on the BR1.MSK field to provide the PREV array. The BR1.MSK may include n+1 bits, which is set based on a number of possible entries to be stored at a given entry record. For example, if an entry record is designed for 32 entries, then n+1 may be equal to 32. In the example, if the particular entry identified by the ENT_SEL is the $30^{th}$ entry, and the only other entries actually stored in the entry record are the second and the fourth entries, then there are only two previous entries, and only the second and the fourth bits are set in the PREV array. The previous entry identifier 234 may then add the count of set bits in the PREV array multiplied by an entry size ENTRY_SIZE (e.g., number of bits per entry) to the BR1.PTR to provide the ENTRY PTR.

At an output, the memory 2 240 may provide the M2 KEY and M2 ACTION to the output logic circuit 260 selected based on the ENTRY PTR. Sometimes the use of hash functions can result is situations where it is impossible to differentiate between collisions (e.g., to distinguish between two keys based on the hash values). In other examples, an entry record may fill up beyond the allocated number of entries (e.g., more than 32 entries, in the example discussed above). For these special cases, the memory 3 250 may store a key and action pairs to supplement the entry record stored at the memory 2 240. In parallel with provision of the M2 KEY and M2 ACTION from the memory 2 240, the memory 3 250 may compare the KEY to entries stored at the memory 3 250, and may provide the M3 HIT IND and corresponding M3 ACTION to the output logic circuit 260 based on the comparison. For example, if there is a hit, the M3 HIT IND will indicate the hit, and the corresponding M3 ACTION may be provided to the output logic circuit 260. If the comparison results in a miss (e.g., no key stored at the memory 3 250 matches the KEY), the M3 HIT IND indicates a miss and no M3 ACTION may be provided.

The output logic circuit 260 may provide the HIT IND and the ACTION based on the outputs received from the memory 2 240 and the memory 3 250. Due to the collision issues previously discussed, the entry pointed to by the ENTRY PTR may not necessarily be the proper entry associated with the KEY. Thus, the comparator 262 may compare the KEY to the M2 KEY to determine if a hit is indicated (e.g., whether the two keys match), and provide a result of the comparison to the OR logic gate 264. The OR logic gate 264 may provide set the HIT IND to indicate a hit if either the M3 HIT IND or the output of the comparator 262 indicate a hit. Otherwise, the OR logic gate 264 may set the HIT IND to indicate a miss. The output logic circuit 260 may further include a multiplexer 266 to receive the M3 ACTION and the M2 ACTION. The multiplexer 266 may provide one of the M3 ACTION or the M2 ACTION as the ACTION based on the M3 HIT IND received from the memory 3 250. In an example, a hit from the M3 may take priority over a key match from the memory 2 240. Thus, for example, if M3 HIT IND from the memory 3 250 indicates a hit, the output logic circuit 260 may provide the M3 ACTION as the ACTION at an output, regardless of the M2 KEY/ACTION from the memory 2 240. Otherwise, the multiplexer 266 may provide the M2 ACTION at an output. The apparatus 200 may process the packet based on the ACTION provided from the output logic circuit 260.

By allocating only a required amount of memory for each entry record in the memory 2 240, 100% of the memory 2 240 may be available for use, as compared with conventional solutions that set aside possible use for each entry record and therefore only have use of 60% or less of available memory. Because 100% of the memory 2 240 is available for use, more entries may be stored at the memory 2 240, which may result in a reduction in the size of the memory 3 250 as compared with a design where only 60% of a RAM device is available for use. Further, use of the memory 1 210 and the hash circuit 220 may provide an efficient means uniquely identifying and providing an indication of a location of an entry of an entry record of the memory 2 240 within a single clock cycle using a single hash function and a small amount of overhead memory in the memory 1 210. Combined, the memory 1 210 and the memory 3 250 may be less than 1% of the total memory of the memory 2 240. In an embodiment, the memory 2 140 may be 8 megabytes (MB), the memory 3 250 may be 2 kilobytes (KB) and the memory 1 210 may be 144 KB.

Figure 3:
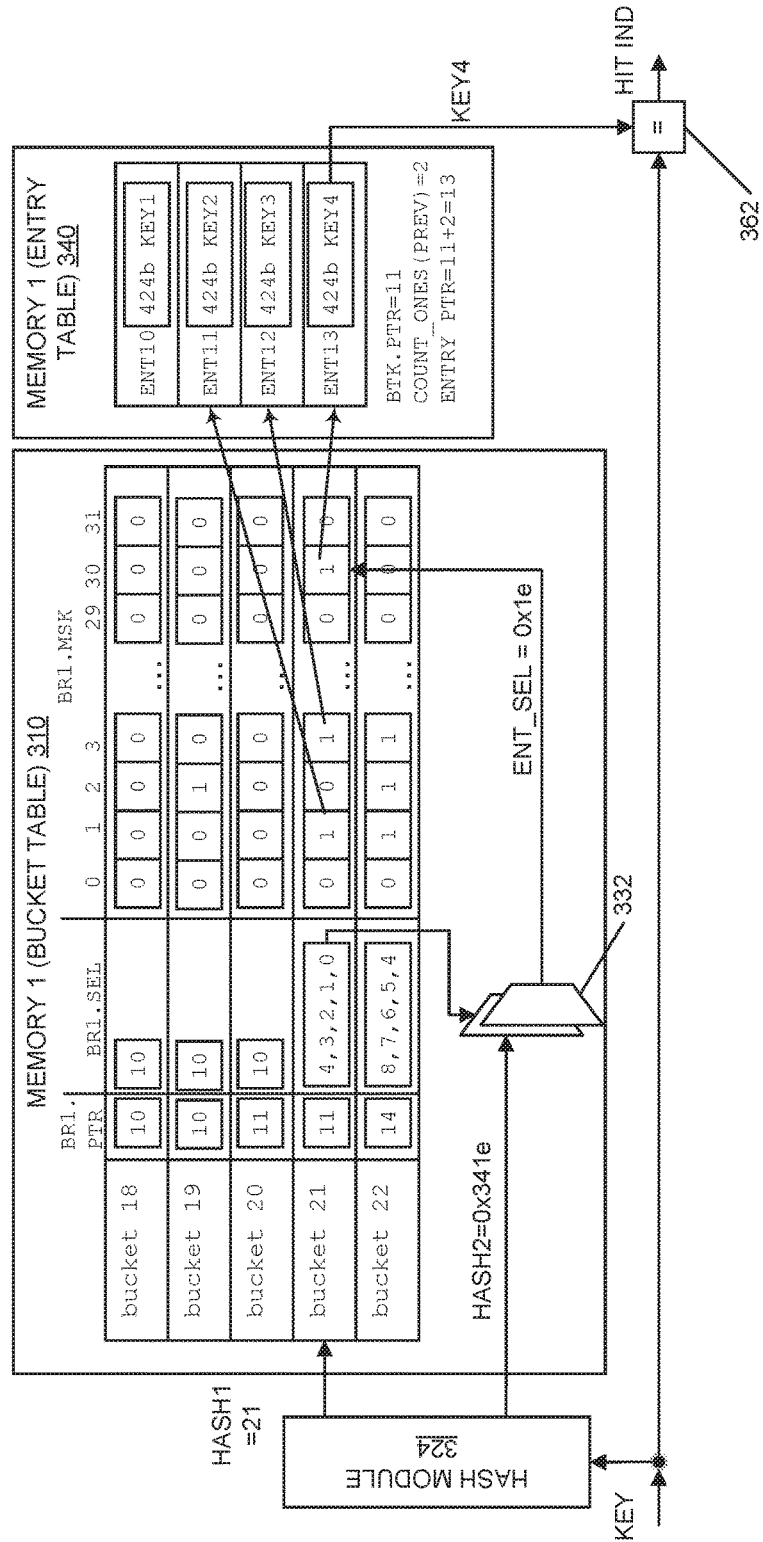
FIG. 3 illustrates components of an exemplary implementation of a pipelined hash circuit in accordance with some embodiments.

FIG. 3 illustrates an apparatus 300 that includes an example implementation of a pipelined hash function methods in accordance with some embodiments, such as embodiments of FIGS. 1 and 2. Illustration of the embodiments present just those components necessary for appreciating the depicted embodiments, such that other components are foreseeable without departing from the teachings herein.

The apparatus 300 may receive a process flow key KEY at a hash module 324. The hash module 324 may perform a hash function on the received key to provide a HASH1 value having a value of 21 and a HASH2 value having a value of 0x341e. The HASH1 value of 21 may indicate a location (e.g., an index value, a pointer value, a physical address value, logical address value or some of means of identifying a particular location of the memory 2 140) of bucket record 21 of the memory 1 310. The bucket record 21 may include a BR1.PTR field having a value of 10, a BR1.SEL field having a value of 4, 3, 2, 1, and 0, and a BR1.MSK having bits 1, 3, and 30 set. The entry selection module 332 may select bits from the HASH2 value to generate the ENT_SEL. In this particular example, the bits of the HASH2 value that are selected are bits 0 to 4. Thus, the ENT_SEL has a value of 0x1e (e.g., 30). Thus, the ENT_SEL identifies the $30^{th}$ entry as the target entry. Bucket logic (e.g., the entry pointer generator 236 of FIG. 2) may then count the number of set bits in the mask before the $30^{th}$ bit, which is 2 in this example (e.g., bits 1 and 3) and add the count multiplied by an entry size of an entry in the memory 2 340 to the BR1.PTR to indicate a location of entry 12. Entry 12 may provide the KEY4 to the comparator 362. The comparator 362 may compare the KEY4 with the KEY to provide a hit indication HIT IND. The memory 1 310 may be included in the memory 1 110 of FIG. 1 and/or the memory 1 210 of FIG. 2. The memory 2 340 may be included in the memory 2 140 of FIG. 1 and/or the memory 2 240 of FIG. 2. The hash module 324 may be included in the hash module 124 of FIG. 1 and/or the hash module 224 of FIG. 2. The comparator 362 may be included in the output logic circuit 160 of FIG. 1 and/or the comparator 262 of FIG. 2. FIG. 3 is an illustration of a specific example of a pipelined hash function. It is appreciated that other values, field lengths, and configurations are contemplated.

Figure 4:
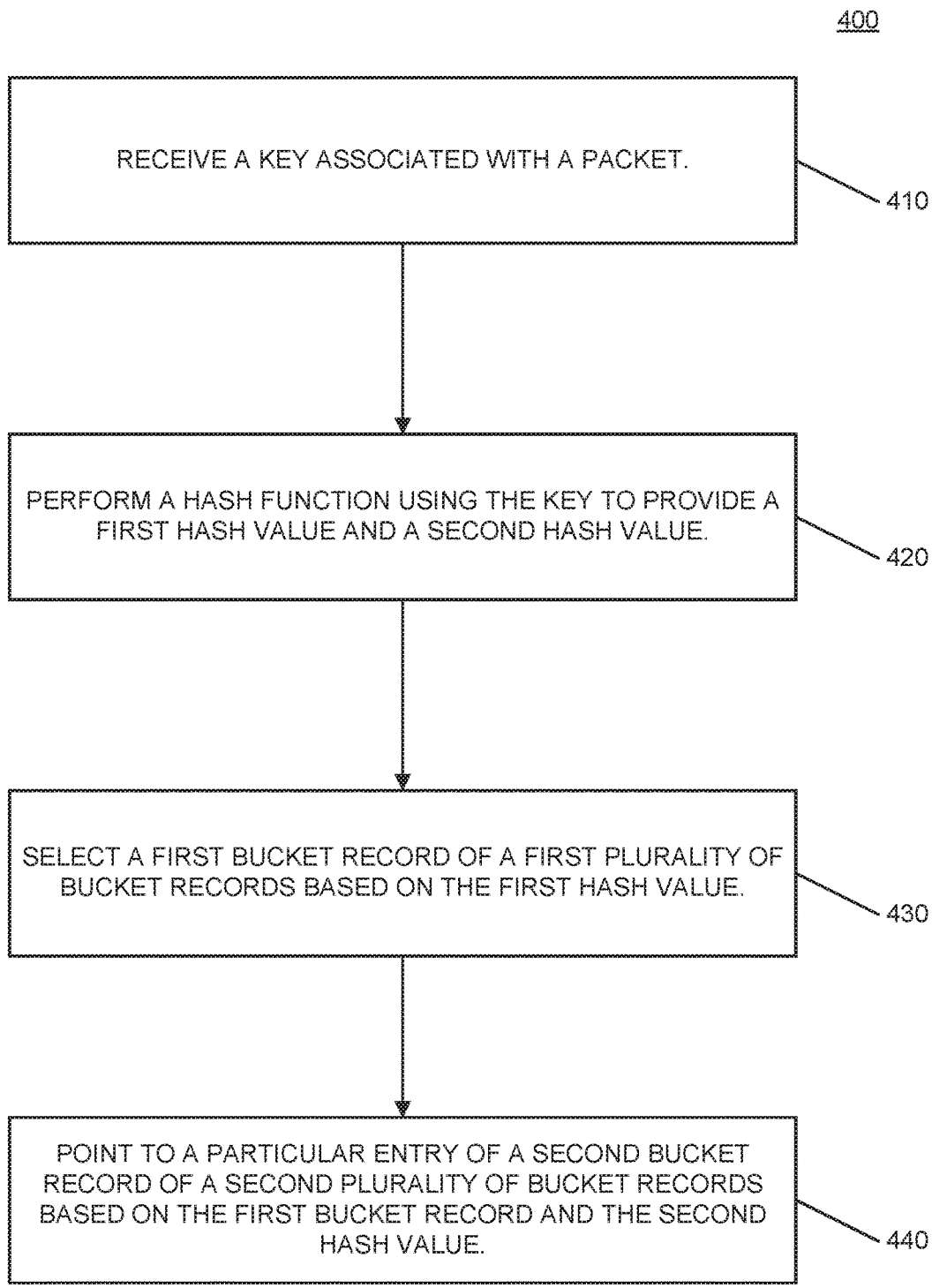
FIG. 4 illustrates a method for performing a pipelined hash circuit operation in accordance with some embodiments.

FIG. 4 illustrates a method 400 for performing a pipelined hash function in accordance with some embodiments. The method 400 implemented as executable instructions represented by one or more modules or circuitry or circuits may be executed by one or more hardware processor(s) from a non-transitory machine-readable storage medium. In an embodiment, the executable instructions representing the pipelined hash function is stored in a non-transitory machine-readable storage medium that when executed by one or more computing devices performs the method 400 processing. The method 400 may be implemented in the apparatus 100 of FIG. 1, the apparatus 200 of FIG. 2, the apparatus 300 of FIG. 3, or combinations thereof.

The method 400 may include receiving a key associated with a packet, at 410. The key may be received at a hash circuit, such as the hash circuit 120 of FIG. 1, the hash circuit 220 of FIG. 2, the hash module 324 of FIG. 3, or combinations thereof. The key may be generated by a receiver circuit, such as the receiver 104 of FIG. 1.

The method 400 may further include performing a hash function using the key to provide a first hash value and a second hash value, at 420. The hash function may be performed by a hash module, such as the hash module 124 of FIG. 1, the hash module 224 of FIG. 2, the hash module 324 of FIG. 3, or combinations thereof.

The method 400 may further include selecting a first bucket record of a first plurality of bucket records based on the first hash value, at 430. The first bucket record may be stored at a memory, such as the memory 1 110 of FIG. 1, the memory 1 210 of FIG. 2, the memory 1 310 of FIG. 3, or combinations thereof.

The method 400 may further include providing an indication of a location of a particular entry of an entry record of a plurality of entry records based on contents of the first bucket record and the second hash value, at 440. The entry record may be stored at a memory, such as the memory 2 140 of FIG. 1, the memory 2 240 of FIG. 2, the memory 2 340 of FIG. 3, or combinations thereof.

In some examples, providing an indication of a location of a particular entry of the entry record of the plurality of entry records may include selecting an individual bit of the second hash value corresponding to each of a plurality of select values included in the first bucket record to provide an entry select value. Selection of the individual bit of the second hash value corresponding to each of the plurality of select values included in the first bucket record to provide the entry select value may be performed by an entry selection module, such as the entry selection module 232 of FIG. 2. The method 400 may further include identifying, up to a bit corresponding to the bucket hash value, which bits of a mask field of the first bucket record have high logical value to provide a previous set array. Identifying which bits of a mask field of the first bucket record have high logical value to provide a previous set array may be performed by a previous entry identifier, such as the previous entry identifier 234 of FIG. 2.

The method 400 may further include identifying the particular entry by adding a count of set values in the previous set array multiplied by an entry size to a bucket pointer of the first bucket record. Adding the count of set values in the previous set array multiplied by the entry size to the bucket pointer of the first bucket record may be performed by an entry pointer generator, such as the previous entry identifier 234 of FIG. 2. The method 400 may further include providing a hit indication in response to a hit associated with an entry of a second plurality of entry records or a match between a key value stored at the particular entry of the entry record and the key. The entry of the second plurality of entry records may be stored at a memory, such as the memory 3 150 of FIG. 1 and/or the memory 3 250 of FIG. 2. The hit indication may be provided from an output logic circuit, such as the output logic circuit 160 of FIG. 1 and/or the output logic circuit 260 of FIG. 2.

Figure 5:
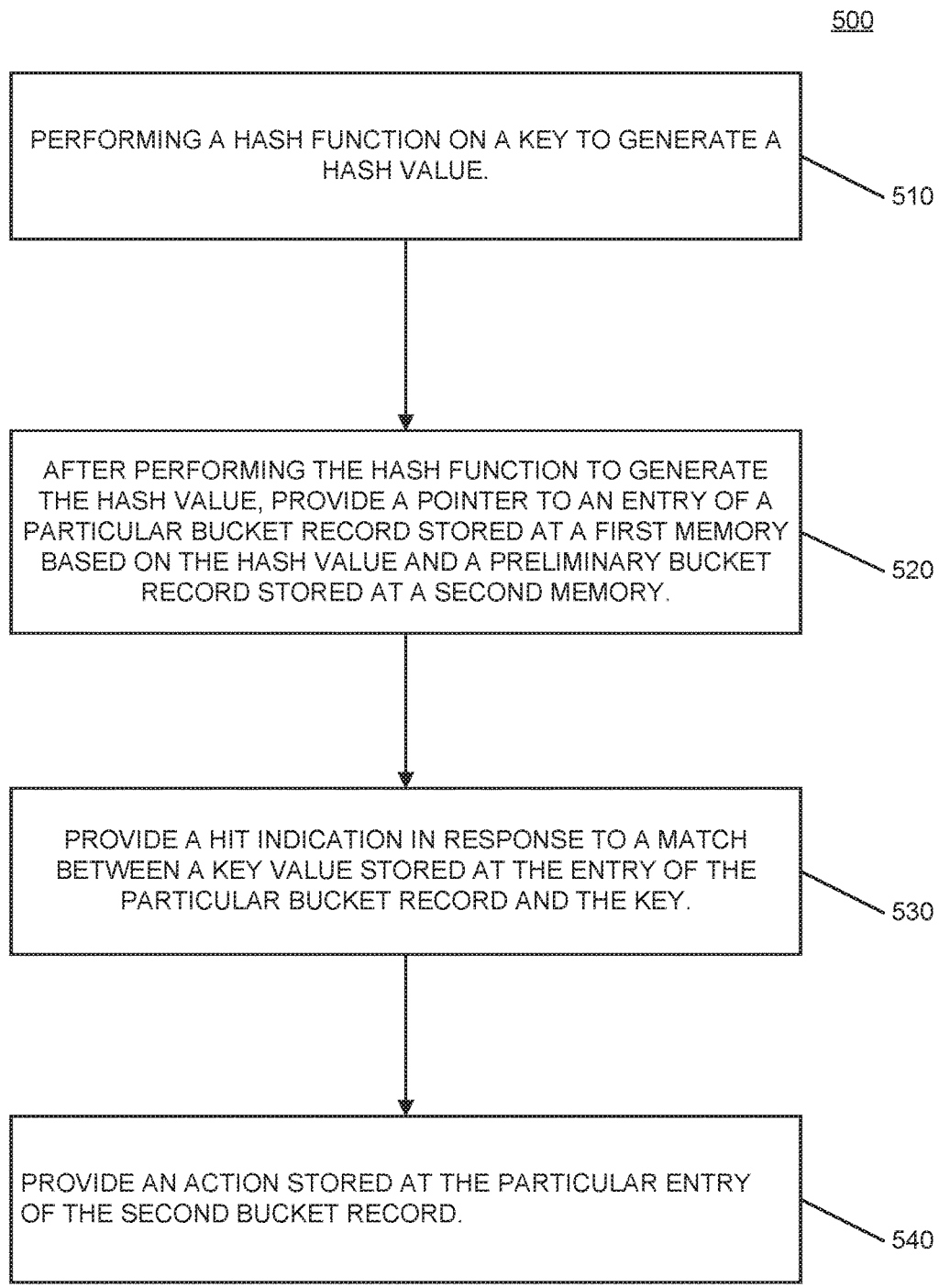
FIG. 5 illustrates a method for performing a pipelined hash circuit operation in accordance with some embodiments.

FIG. 5 illustrates a method 500) for performing a pipelined hash function in accordance with some embodiments. The method 500 implemented as executable instructions represented by one or more software modules and executed by one or more hardware processor(s) from a non-transitory machine-readable storage medium. In an embodiment, the executable instructions representing the pipelined hash function is stored in a non-transitory machine-readable storage medium that when executed by one or more computing devices performs the method 500 processing. The method 500 may be implemented in the apparatus 100 of FIG. 1, the apparatus 200 of FIG. 2, the apparatus 300 of FIG. 3, or combinations thereof.

The method 500 may include performing a hash function on a key to generate a hash value, at 510. The key may be received at a hash circuit, such as the hash circuit 120 of FIG. 1, the hash circuit 220 of FIG. 2, the hash module 324 of FIG. 3, or combinations thereof. The key may be generated by a receiver circuit, such as the receiver 104 of FIG. 1. The hash function may be performed by a hash module, such as the hash module 124 of FIG. 1, the hash module 224 of FIG. 2, the hash module 324 of FIG. 3, or combinations thereof.

The method 500 may further include, after performing the hash function to generate the hash value, providing a pointer to an entry of a particular entry record stored at a first memory based on the hash value and a bucket record stored at a second memory, at 520. Provision of the pointer to an entry of a particular bucket record stored at the first memory based on the hash value and the bucket record stored at the second memory may be performed by bucket logic, such as the hash circuit 120 of FIG. 1 and/or the hash circuit 220 of FIG. 2. The first memory may include the memory 2 140 of FIG. 1, the memory 2 240 of FIG. 2, the memory 2 340 of FIG. 3, or combinations thereof. The second memory may include the memory 1 110 of FIG. 1, the memory 1 210 of FIG. 2, the memory 1 310 of FIG. 3, or combinations thereof. Provision of the pointer to an entry of a particular entry record stored at the first memory may include retrieving the entry record from the second memory based on a first subset of bits of the hash value, and providing a pointer to the particular entry of the entry record based on information included in the bucket record and a second subset of bits of the hash value.

The method 500 may further providing a hit indication in response to a match between a key value stored at the entry of the particular bucket record and the key, at 530. The hit indication may be provided by a comparator, such as the comparator 262 of FIG. 2 and/or the comparator 362 of FIG. 3. The method 500 may further include comparing the key value stored at the entry of the particular bucket record with the key. The entry record may be stored at a memory, such as the memory 1 110 of FIG. 1, the memory 1 210 of FIG. 2, the memory 1 310 of FIG. 3, or combinations thereof. The method 500 may further include providing the hit indication responsive to a hit detected between the key and an entry of a second entry record stored at a third memory. The third memory may include the memory 3 150 of FIG. 1 and/or the memory 3 250 of FIG. 2.

The method 500 may further include providing an action stored at the particular entry of the bucket record, at 540. The action may be provided by an output logic circuit, such as the output logic circuit 160 of FIG. 1 and/or the output logic circuit 260 of FIG. 2. The method 500 may further include providing an action stored at the entry of the third bucket record based on a hit detected between the key and the entry of the third bucket record.

Figure 6:
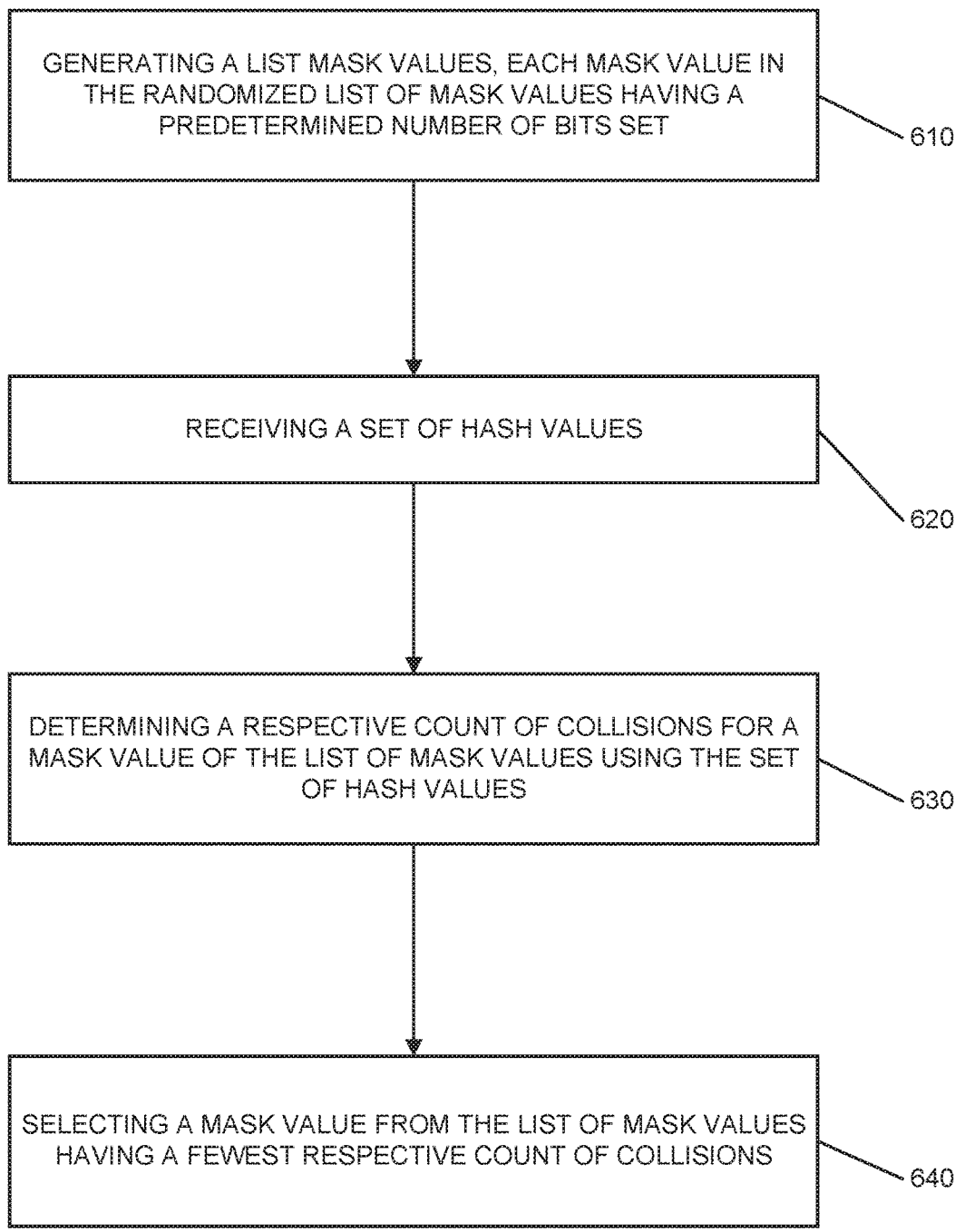
FIG. 6 illustrates a method for generating a mask value for colliding hash values in accordance with some embodiments.

FIG. 6 illustrates a method 600 for generating a mask value for colliding hash values in accordance with some embodiments. The method 600 implemented as executable instructions represented by one or more software modules and executed by one or more hardware processor(s) from a non-transitory machine-readable storage medium. In an embodiment, the executable instructions representing the mask generator is stored in a non-transitory machine-readable storage medium that when executed by one or more computing devices performs the method 600 processing. The method 600 may be provide the mask field used in the apparatus 100 of FIG. 1, the apparatus 200 of FIG. 2, the apparatus 300 of FIG. 3, the mask field used in the methods 400 and/or 500, or combinations thereof.

The method 600 may include generating a list of mask values, at 610. Each mask value of the list of mask values may include a predetermined number of bits. The predetermined number of bits set may be based on a total count of bits in a hash value of the set of hash values. For example, if the number of bits is 16, the count of bits in the mask value may be 5 bits. In some examples, the number of bits in the mask value may be equal to a count of values in the BR1.SEL field of FIGS. 1-3. In some examples, generating the list of mask values may include randomizing a set of mask values to provide the list of mask values.

The method 600 may further include receiving a set of hash values, at 620. In an example, the set of hash values may include the set of HASH2 values that correspond to HASH1 values that collided into a single bucket record of FIGS. 1-3.

The method 600 may further include determining a respective count of collisions for a mask value of the list of mask values using the set of hash values, at 630. The method 600 may further include selecting a mask value from the list of mask values having a fewest respective count of collisions, at 640. In some examples, the method 600 may include, responsive to a determination that the respective count of collisions for the mask value of the list of mask values is equal to zero, selecting the mask value. That is, if no collisions are detected, the method 600 may end. In some examples, the method 600 may include, responsive to a determination that the respective count of collisions for the mask value of the list of mask values is a non-zero number, determining a respective count of collisions for a next mask value of the list of mask values using the set of hash values. The method 600 may continue to cycle through the list of the mask values until a zero collisions are detected for a mask value, or the list has been exhausted.

In some examples, determining the respective count of collisions for the mask value of the list of mask values using the set of hash values may include applying the mask value to a first hash value of the set of hash values to generate a first value and applying the mask value to a second hash value of the set of hash values to generate a second value. The first value may be compared to the second value, and responsive to the first value matching the second value, the respective count of collisions for the mask value may be incremented.

Figure 7:
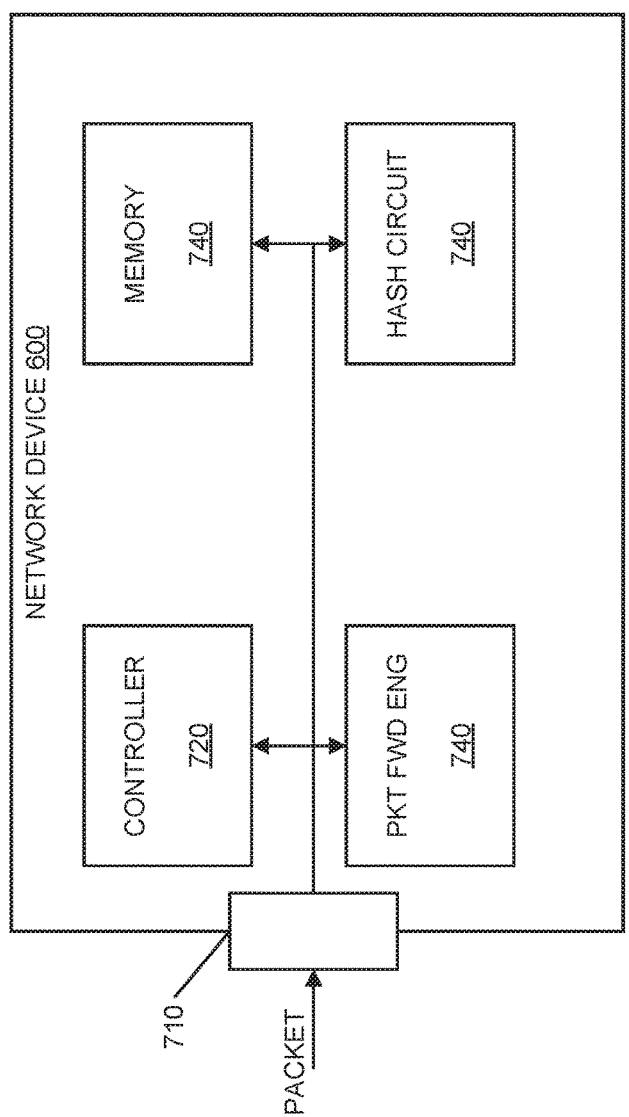
FIG. 7 illustrates components of network device including a pipelined hash circuit in accordance with some embodiments.

FIG. 7 is a block diagram of a network device 700 according to some embodiments. The network device 700 includes a communication port 710 that may be used to exchange information packets with other devices. Note that more than one communication port 710 may be associated with the network device 700. The network device 700 also includes a controller 720. The controller 720 may comprise one or more processor units, for example, a control plane processor, that performs control and system management functions as well as executing real-time applications. The network device 700 further includes a packet forwarding engine 730 that may be used to determine routing information based on an information packet's associated destination address. The packet forwarding engine 730 may also facilitate flow categorization, congestion management, and set queuing priorities.

The packet forwarding engine 730 may also access a hashing unit 250, such as a hash circuit 750 that supports a pipelined hash function and a memory 740. The hash circuit may implement the hash circuit 120 of FIG. 1, the hash circuit 220 of FIG. 2, the hash module 324 of FIG. 3, or combinations thereof. Further, the hash module 324, in combination with the controller 720 and the memory 740, may perform the method 400, the method 500, the method 600, or combinations thereof. The memory 740 may include the memory 1 110, the memory 2 140, and/or the memory 3 150 of FIG. 1, the memory 1 210, the memory 2 240, and/or the memory 3 250 of FIG. 2, the memory 1 310 and/or the memory 2 340 of FIG. 3, or combinations thereof. Although a particular network device 700 is illustrated in FIG. 7, according to other embodiments, the network device 700 may include fewer and/or different components.

Examples, as described herein, may include, or may operate on, logic or a number of components, modules, circuitry or circuits, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium The terms "module" and circuitry/circuits are understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules or circuits/circuitry are temporarily configured, a module or a circuit/circuitry need not be instantiated at any one moment in time. For example, where the modules or circuits/circuitry comprise a general-purpose hardware processor configured using software; the general-purpose hardware processor may be configured as respective different modules or circuits/circuitry at different times. Software may accordingly configure a hardware processor, for example, to constitute a particular module or circuit at one instance of time and to constitute a different module or circuit at a different instance of time. The terms "application, process, or service," or variants thereof, is used expansively herein to include routines, program modules, programs, components, circuits/circuitry, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

Additional Notes & Examples

Example 1 includes subject matter (such as a device, apparatus, network device, or machine) to perform a pipelined hash function comprising: a first memory to store a plurality of bucket records, a second memory to store a plurality of entry records; and a hash circuit to receive a key and to perform a pipelined hash function using the key to provide a hash value, the hash circuit further to select a first bucket record of the plurality of bucket records from the first memory based on a first subset of bits of the hash value, the hash circuit further to provide an indication of a location of a particular entry of an entry record of the plurality of entry records based on contents of the first bucket record and a second subset of bits of the hash value.

In Example 2, the subject matter of Example 1 may include, wherein the hash circuit comprises bucket logic circuitry to generate an entry pointer based on the first hash bucket record and the second subset of bits of the hash value, wherein the entry pointer provides the indication of the location of the particular entry of the entry record.

In Example 3, the subject matter of any one of Examples 1 to 2 may include, wherein the first bucket record comprises a select field that includes a plurality of select values, wherein the bucket logic circuitry includes an entry selection module to select an individual bit of the second subset of bits of the hash value corresponding to each of the plurality of select values to provide an entry select value.

In Example 4, the subject matter of any one of Examples 1 to 3 may include, wherein the first bucket record comprises a mask field to identify one or more entries currently stored in the entry record, wherein the bucket logic circuitry further includes a previous array identifier to identify which of the mask field bits less than the entry select value have high logical value to provide a previous set array.

In Example 5, the subject matter of any one of Examples 1 to 4 may include, wherein the first bucket record comprises bucket pointer field to indicate a location of a first entry of the entry record, wherein the bucket logic circuitry further includes an entry pointer generator to identify the particular entry of the one or more entries of the entry record by adding a count of high logical values in the previous set array multiplied by an entry size to the bucket pointer to provide the entry pointer.

In Example 6, the subject matter of any one of Examples 1 to 5 may include, a third memory to store a third plurality of bucket records.

In Example 7, the subject matter of any one of Examples 1 to 6 may include, wherein the first memory and the second memory are each random-access memories and the third memory is content-addressable memory.

In Example 8, the subject matter of any one of Examples 1 to 7 may include, an output logic circuit to provide a hit indication in response to a hit in an entry of a bucket record of the third plurality of bucket records or in response to a match between the key and a key value stored in the particular entry of the entry record.

In Example 9, the subject matter of any one of Examples 1 to 8 may include, wherein the output logic circuit further to provide an output action stored in an entry of a bucket record of the third plurality of bucket records responsive to a hit associated with the entry of the bucket record of the third plurality of bucket records, the output logic circuit further to provide an output action stored in the particular entry of the entry record responsive a miss associated with the entry of the bucket record of the third plurality of bucket records.

In Example 10, the subject matter of any one of Examples 1 to 9 may include, a receiving circuit to receive a packet and to generate the key based on data in the packet.

Example 11 includes subject matter (such as a method, means for performing acts, machine readable medium including instructions that when performed by a machine cause the machine to performs acts, or an apparatus to perform) to perform a pipelined hash function comprising: receiving a key associated with a packet; performing a hash function using the key to provide a first hash value and a second hash value; selecting a first bucket record of a plurality of bucket records based on contents of the first hash value; and providing an indication of a location of a particular entry of a an entry record of a plurality of entry records based on contents of the first bucket record and the second hash value.

In Example 12, the subject matter of Example 11 may include, wherein providing the indication of the location of the particular entry of the entry record of the plurality of entry records selecting an individual bit of the second hash value corresponding to each of a plurality of select values included in the first bucket record to provide an entry select value.

In Example 13, the subject matter of any one of Examples 11 to 12 may include, identifying, up to a bit corresponding to the entry select value, which bits of a mask field of the first bucket record have high logical value to provide a previous set array.

In Example 14, the subject matter of any one of Examples 11 to 13 may include, identifying the particular entry by adding a count of set values in the previous set array multiplied by an entry size to a bucket pointer of the first bucket record.

In Example 15, the subject matter of any one of Examples 11 to 14 may include, providing a hit indication in response to a hit associated with an entry of a third plurality of bucket records or a match between a key value stored at the particular entry of the entry record and the key.

Example 16 includes at least one machine-readable medium including instructions that, when executed on a machine cause the machine to perform any of the Examples 11-15.

Example 17 includes an apparatus comprising means for performing any of the Examples 11-15.

Example 18 includes subject matter (such as a method, means for performing acts, machine readable medium including instructions that when performed by a machine cause the machine to performs acts, or an apparatus to perform) to perform a pipelined hash function comprising: performing a hash function on a key to generate a hash value; after performing the has function to generate the hash value, providing a pointer to indication a location of an entry of a particular entry record stored at a first memory based on the hash value and contents of a bucket record stored at a second memory; providing a hit indication in response to a match between a key value stored at the entry of the particular entry record and the key; and providing an action stored at the particular entry of the entry record.

In Example 19, the subject matter of Example 18 may include, wherein providing the pointer to indicate the location of the entry of the particular entry record comprises: retrieving the bucket record from the second memory based on a first subset of bits of the hash value; and providing a pointer to indicate the location of the particular entry of the particular entry record based on information included in the particular entry record and a second subset of bits of the hash value.

In Example 20, the subject matter of any one of Examples 18 to 19 may include, comparing the key value stored at the entry of the particular entry record with the key.

In Example 21, the subject matter of any one of Examples 18 to 20 may include, providing the hit indication responsive to a hit detected between the key and an entry of a second entry record stored at a third memory.

In Example 22, the subject matter of any one of Examples 18 to 21 may include, providing an action stored at the entry of the second entry record based on a hit detected between the key and the entry of the second entry record.

Example 23 includes at least one machine-readable medium including instructions that, when executed on a machine cause the machine to perform any of the Examples 18-23.

Example 24 includes an apparatus comprising means for performing any of the Examples 18-23.

Example 25 includes subject matter (such as a device, apparatus, or machine) to perform a pipelined hash function comprising: the plurality of memories; and the processor configured to: receive a packet; provide a key based on data included in the packet; perform a hash function on the key to generate a hash value; provide a pointer to indicate a location of an entry of a particular entry record stored at a first memory of the plurality of memories based on the hash value and contents of a bucket record stored at a second memory of the plurality of memories; provide a hit indication in response to a match between a key value stored at the entry of the particular entry record and the key; and provide, to an output, an action stored at the particular entry of the entry record.

In Example 26, the subject matter of Example 25 may include, wherein the processor configured to provide a pointer to indicate the location of the entry of an entry of a particular entry record stored at a first memory of the plurality of memories based on the hash value and contents of the bucket record stored at a second memory of the plurality of memories comprises the processor configured to: retrieve the bucket record from the second memory based on a first subset of bits of the hash value; and provide the pointer to indicate the location of the particular entry of the entry record based on information included in the entry record and a second subset of bits of the hash value.

In Example 27, the subject matter of any one of Examples 25 to 26 may include, wherein the processor is further configured to compare the key value stored at the entry of the particular entry record with the key.

In Example 28, the subject matter of any one of Examples 25 to 27 may include, wherein the processor is further configured to provide the hit indication responsive to a hit detected between the key and an entry of a second entry record stored at a third memory of the plurality of memories.

In Example 29, the subject matter of any one of Examples 25 to 28 may include, wherein the processor is further configured to provide an action stored at the entry of the second entry record based on a hit detected between the key and the entry of the second entry record.

In Example 30, the subject matter of any one of Examples 25 to 29 may include, wherein third memory is a different memory type than the first memory and the second memory.

Example 31 includes subject matter (such as a device, apparatus, or machine) to perform a pipelined hash function comprising: means for performing a hash function on a key to generate a hash value; after performing the has function to generate the hash value, means for providing a pointer to indicate a location of an entry of a particular entry record stored at a first memory based on the hash value and a contents of bucket record stored at a second memory; means for providing a hit indication in response to a match between a key value stored at the entry of the particular entry record and the key; and means for providing an action stored at the particular entry of the entry record.

In Example 32, the subject matter of Example 31 may include, wherein means for providing the pointer to indicate the location of the entry of the particular entry record comprises: means for retrieving the bucket record from the second memory based on a first subset of bits of the hash value; and means for providing a pointer to indicate the location of the particular entry of the particular entry record based on information included in the particular entry record and a second subset of bits of the hash value.

In Example 33, the subject matter of any one of Examples 31 to 32 may include, means for comparing the key value stored at the entry of the particular entry record with the key.

In Example 34, the subject matter of any one of Examples 31 to 33 may include, means for providing the hit indication responsive to a hit detected between the key and an entry of a second entry record stored at a third memory.

In Example 35, the subject matter of any one of Examples 31 to 34 may include, means for providing an action stored at the entry of the second entry record based on a hit detected between the key and the entry of the second entry record.

Example 36 includes subject matter (such as a method, means for performing acts, machine readable medium including instructions that when performed by a machine cause the machine to performs acts, or an apparatus to perform) to generate a mask for colliding hash values comprising: generating a list of mask values, wherein each mask value of the list of mask values has a predetermined number of bits set; receiving a set of hash values; determining a respective count of collisions for a mask value of the list of mask values using the set of hash values; and selecting a mask value from the list of mask values having a fewest respective count of collisions.

In Example 37, the subject matter of Example 36 may include, wherein the predetermined number of bits set is based on a total count of bits in a hash value of the set of hash values.

In Example 38, the subject matter of any one of Examples 36 to 37 may include, responsive to a determination that the respective count of collisions for the mask value of the list of mask values is equal to zero, selecting the mask value.

In Example 39, the subject matter of any one of Examples 36 to 38 may include, responsive to a determination that the respective count of collisions for the mask value of the list of mask values is a non-zero number, determining a respective count of collisions for a next mask value of the list of mask values using the set of hash values.

In Example 40, the subject matter of any one of Examples 36 to 39 may include, wherein determining the respective count of collisions for the mask value of the list of mask values using the set of hash values comprises: applying the mask value to a first hash value of the set of hash values to generate a first value; applying the mask value to a second hash value of the set of hash values to generate a second value; comparing the first value to the second value; and responsive to the first value matching the second value, incrementing the respective count of collisions for the mask value.

In Example 41, the subject matter of any one of Examples 36 to 40 may include, wherein generating the list of mask values comprises randomizing a set of mask values to provide the list of mask values.

Example 42 includes at least one machine-readable medium including instructions that, when executed on a machine cause the machine to perform any of the Examples 36-41.

Example 43 includes an apparatus comprising means for performing any of the Examples 36-41.

Example 44 includes subject matter (such as a device, apparatus, or machine) to perform a pipelined hash function comprising: means for generating a list of mask values, wherein each mask value of the list of mask values has a predetermined number of bits set; means for receiving a set of hash values; means for determining a respective count of collisions for a mask value of the list of mask values using the set of hash values; and means for selecting a mask value from the list of mask values having a fewest respective count of collisions.

In Example 45, the subject matter of Example 44 may include, wherein the predetermined number of bits set is based on a total count of bits in a hash value of the set of hash values.

In Example 46, the subject matter of any one of Examples 44 to 45 may include, responsive to a determination that the respective count of collisions for the mask value of the list of mask values is equal to zero, means for selecting the mask value.

In Example 47, the subject matter of any one of Examples 44 to 46 may include, responsive to a determination that the respective count of collisions for the mask value of the list of mask values is a non-zero number, means for determining a respective count of collisions for a next mask value of the list of mask values using the set of hash values.

In Example 48, the subject matter of any one of Examples 44 to 47 may include, wherein means for determining the respective count of collisions for the mask value of the list of mask values using the set of hash values comprises: means for applying the mask value to a first hash value of the set of hash values to generate a first value; means for applying the mask value to a second hash value of the set of hash values to generate a second value; means for comparing the first value to the second value; and responsive to the first value matching the second value, means for incrementing the respective count of collisions for the mask value.

In Example 49, the subject matter of any one of Examples 44 to 48 may include, wherein means for generating the list of mask values comprises means for randomizing a set of mask values to provide the list of mask values.

Example 50 includes subject matter (such as a device, apparatus, or machine) to perform a pipelined hash function comprising: means for performing a hash function on a key to generate a hash value; after performing the has function to generate the hash value, means for providing a pointer to indication a location of an entry of a particular entry record stored at a first memory based on the hash value and contents of a bucket record stored at a second memory; means for providing a hit indication in response to a match between a key value stored at the entry of the particular entry record and the key; and means for providing an action stored at the particular entry of the entry record.

In Example 51, the subject matter of Example 50 may include, wherein means for providing the pointer to indicate the location of the entry of the particular entry record comprises: means for retrieving the bucket record from the second memory based on a first subset of bits of the hash value; and means for providing a pointer to indicate the location of the particular entry of the particular entry record based on information included in the particular entry record and a second subset of bits of the hash value.

In Example 52, the subject matter of any one of Examples 50 to 51 may include, means for comparing the key value stored at the entry of the particular entry record with the key.

In Example 53, the subject matter of any one of Examples 50 to 52 may include, means for providing the hit indication responsive to a hit detected between the key and an entry of a second entry record stored at a third memory.

In Example 54, the subject matter of any one of Examples 50 to 53 may include, means for providing an action stored at the entry of the second entry record based on a hit detected between the key and the entry of the second entry record.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network device to perform a pipelined hash function, comprising:
   a first memory to store a plurality of bucket records, wherein the first memory is random-access memory;
   a second memory to store a plurality of entry records, wherein the second memory is random-access memory;
   a third memory to store a second plurality of entry records, wherein the third memory is content-addressable memory; and
   a hash circuit to:
   receive a key;
   perform a pipelined hash function using the key to provide a hash value having a first subset of bits and a second subset of bits;

select a first bucket record of the plurality of bucket records from the first memory based on the first subset of bits of the hash value;

provide an entry pointer to a location of a particular entry of an entry record of the plurality of entry records in the second memory based on contents of the selected first bucket record that identify a subset of bits of the second subset of bits of the hash value that may be used to uniquely identify the particular entry of the entry record of the plurality of entry records in the second memory that is associated with the key; and an output logic circuit to:

provide a hit indication in response to a hit in an entry of an entry record of the second plurality of entry records in the third memory or in response to a match between the key and a key value stored in the particular entry of the entry record of the plurality of entry records in the second memory, wherein the selected first bucket record comprises a mask field to identify one or more entries currently stored in the entry record of the plurality of entry records, and a bucket pointer field to indicate a location of a first entry of the entry record of the plurality of entry records, and wherein the hash circuit comprises bucket logic circuitry that includes a previous array identifier to identify which of the mask field bits less than an entry select value have high logical value to provide a previous set array, and an entry pointer generator to identify the particular entry of the one or more entries of the entry record of the plurality of entry records by adding a count of high logical values in the previous set array multiplied by an entry size to a bucket pointer of the selected first bucket record to provide the entry pointer.

2. The network device of claim 1, wherein the selected first bucket record comprises a select field that includes a plurality of select values, and wherein the hash circuit comprises bucket logic circuitry that includes an entry selection module to select an individual bit of the second subset of bits of the hash value corresponding to each of the plurality of select values to provide the entry select value.

3. The network device of claim 1, wherein the output logic circuit further provides an output action stored in an entry of the second plurality of entry records of the third memory responsive to a hit associated with the entry of the second plurality of entry records of the third memory, the output logic circuit further providing an output action stored in the particular entry of the plurality of entry records in the second memory responsive to a miss associated with the entry of the second plurality of entry records of the third memory.

4. The network device of claim 1, further comprising a receiving circuit to receive a packet and to generate the key based on data in the packet.

5. A non-transitory machine-readable medium including instructions that, when executed on a machine cause the machine to:

receive a key associated with a packet;

perform a pipelined hash function using the key to provide a first hash value and a second hash value;

select a first bucket record of a plurality of bucket records based on contents of the first hash value, wherein the plurality of bucket records are stored in a first random-access memory;

provide an entry pointer to a location of a particular entry of an entry record of a plurality of entry records based on contents of the selected first bucket record that identify a subset of bits of the second hash value that may be used to uniquely identify the particular entry of the entry record of the plurality of entry records that is associated with the key, wherein the plurality of entry records are stored in a second random-access memory; and provide a hit indication in response to a hit associated with an entry of an entry record of a second plurality of entry records or in response to a match between the key and a key value stored in the particular entry of the entry record of the plurality of entry records in the second random-access memory, wherein the second plurality of entry records are stored in content-addressable memory, wherein the selected first bucket record comprises a mask field to identify one or more entries currently stored in the entry record of the plurality of entry records, and a bucket pointer field to indicate a location of a first entry of the entry record of the plurality of entry records, and wherein the pipelined hash function includes a previous array identifier to identify which of the mask field bits less than an entry select value have high logical value to provide a previous set array, and an entry pointer generator to identify the particular entry of the one or more entries of the entry record of the plurality of entry records by adding a count of high logical values in the previous set array multiplied by an entry size to a bucket pointer of the selected first bucket record to provide the entry pointer.

6. The non-transitory machine-readable medium of claim 5, including instructions that, when executed on the machine, cause the machine to provide the entry pointer to the location of the particular entry of the entry record of the plurality of entry records and to select an individual bit of the second hash value corresponding to each of a plurality of select values included in the first bucket record to provide the entry select value.

7. A device to perform a pipelined hash function, comprising:

a plurality of memories including random-access memory and content-addressable memory; and a processor configured to:

receive a packet;

provide a key based on data included in the packet;

perform a pipelined hash function on the key to generate a hash value having a first subset of bits and a second subset of bits;

select a first bucket record of a plurality of bucket records from a first random-access memory based on a first subset of bits of the hash value;

provide an entry pointer to a location of a particular entry of an entry record of a plurality of entry records in a second random-access memory based on contents of the selected first bucket record that identify a subset of bits of the second subset of bits of the hash value that may be used to uniquely identify the particular entry of the entry record of the plurality of entry records in the second random-access memory that is associated with the key;

provide a hit indication in response to a hit detected between the key and an entry of a second entry record stored at a third memory of the plurality of memories, wherein the third memory is content-addressable memory, or in response to a match between a key value stored at the particular entry record of the plurality of entry records in the second random-access memory and the key; and provide, to an output, an action stored at the particular entry record of the plurality of entry records in the second random-access memory, wherein the selected first bucket record comprises a mask field to identify one or more entries currently stored in the entry record of the plurality of entry records, and a bucket pointer field to indicate a location of a first entry of the entry record of the plurality of entry records, and wherein the pipelined hash function includes a previous array identifier to identify which of the mask field bits less than an entry select value have high logical value to provide a previous set array, and an entry pointer generator to identify the particular entry of the one or more entries of the entry record of the plurality of entry records by adding a count of high logical values in the previous set array multiplied by an entry size to a bucket pointer of the selected first bucket record to provide the entry pointer.

8. The device of claim 7, wherein the selected first bucket record comprises a select field that includes a plurality of select values, and wherein the pipelined hash function selects an individual bit of the second subset of bits of the hash value corresponding to each of the plurality of select values to provide the entry select value.

* * * * *